US010944856B2

(12) United States Patent
Taktak

(10) Patent No.: US 10,944,856 B2
(45) Date of Patent: Mar. 9, 2021

(54) HAPTIC BASED COMMUNICATION METHOD

(71) Applicant: Revolutioneyes Me Limited, London (GB)

(72) Inventor: George Taktak, London (GB)

(73) Assignee: Revolutioneyes Me Limited, London (GB)

(*) Notice: Subject to any disclaimer, the term of this patent is extended or adjusted under 35 U.S.C. 154(b) by 0 days.

(21) Appl. No.: 16/639,704

(22) PCT Filed: Aug. 16, 2018

(86) PCT No.: PCT/GB2018/052329
§ 371 (c)(1),
(2) Date: Feb. 17, 2020

(87) PCT Pub. No.: WO2019/034881
PCT Pub. Date: Feb. 21, 2019

(65) Prior Publication Data
US 2020/0236211 A1 Jul. 23, 2020

(30) Foreign Application Priority Data

Aug. 18, 2017 (GB) .................................. 1713301.8

(51) Int. Cl.
*H04M 1/725* (2021.01)
*G06F 3/00* (2006.01)
*G06F 3/01* (2006.01)

(52) U.S. Cl.
CPC ........ *H04M 1/72547* (2013.01); *G06F 3/016* (2013.01); *H04M 2250/12* (2013.01)

(58) Field of Classification Search
CPC . G06F 3/00; G06F 3/011; G06F 3/014; G06F 3/016; G06F 3/017; G06F 1/163;
(Continued)

(56) References Cited

U.S. PATENT DOCUMENTS 9,313,314 B2* 4/2016 Kim ..................... H04M 1/7253
10,120,446 B2* 11/2018 Pance ..................... G06F 3/041
(Continued)

FOREIGN PATENT DOCUMENTS

EP 3062198 B1 9/2019

OTHER PUBLICATIONS

International Search Report and Written Opinion of counterpart PCT Application No. PCT/GB2018/052329 dated Oct. 24, 2018.
(Continued)

*Primary Examiner* — Magdi Elhag
(74) *Attorney, Agent, or Firm* — Chambliss, Bahner & Stophel, P.C.

(57) ABSTRACT

The invention relates to a communication method for use by a plurality of users to provide an indication of a status of a user, comprising the steps of: a) a user providing information about a first status indicator b) said user providing information about a second status indicator; c) generating a vibration pattern representing a variability measure based on said first and second status indicators wherein said vibration pattern comprises a series of beats, each beat comprising at least two pulses of non-zero intensity, wherein the pulses within each beat are spaced at a first frequency, and said beats are spaced at a second frequency, d) transmitting the vibration pattern providing information on said variability measure to a third party, wherein said vibration pattern changes by varying said first and/or said second frequency, as said variability measure changes. In some cases the intensity of one or more of said pulses of said vibration pattern can be adjusted by said user to provide additional information to said variability measure. The method may further include users tracing a path on a device and transmitting and displaying a path on a device of said second user.

17 Claims, 8 Drawing Sheets

Figure 1:
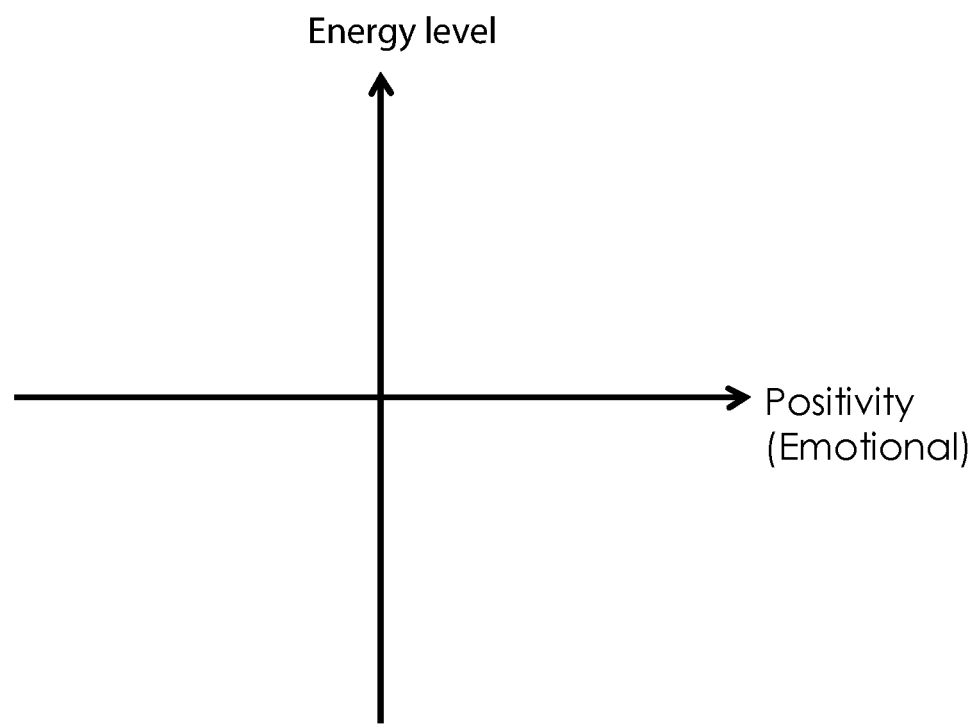

(58) Field of Classification Search
CPC ... G06F 3/0488; H04M 1/21; H04M 1/72547; H04M 1/72569; H04M 2250/12
See application file for complete search history.

(56) References Cited

U.S. PATENT DOCUMENTS

| | | | |
|---|---|---|---|
| 2010/0123588 A1 | 5/2010 | Cruz Hernandez | |
| 2013/0063256 A1 | 3/2013 | Tartz et al. | |
| 2013/0198625 A1* | 8/2013 | Anderson | G06F 3/016 715/701 |
| 2014/0066017 A1* | 3/2014 | Cho | H04L 63/168 455/411 |
| 2014/0086105 A1* | 3/2014 | Kang | H04L 67/26 370/259 |
| 2014/0320418 A1* | 10/2014 | Tseng | G06F 3/04883 345/173 |
| 2015/0002435 A1* | 1/2015 | Shimizu | G09G 5/12 345/173 |
| 2015/0296480 A1* | 10/2015 | Kinsey | H04M 19/047 455/41.3 |
| 2016/0196726 A1* | 7/2016 | Saito | G06F 1/1684 340/407.1 |
| 2016/0253552 A1* | 9/2016 | Rihn | H04M 1/72569 382/224 |
| 2016/0375346 A1* | 12/2016 | Czaja | A61B 5/1036 434/253 |

OTHER PUBLICATIONS

Brown, "Shake2Talk: Multimodal Messaging for Interpersonal Communication," pp. 44-55, Nov. 29, 2007.

* cited by examiner

HAPTIC BASED COMMUNICATION METHOD

This invention relates to a haptic based communication method that allows for communication between parties using transmission and detection of vibrations.

There is an increasing need for people with special needs or with health conditions such as Alzheimer's disease (dementia) or other mental health disorders to be able to easily and effectively communicate with other people without requiring the use of additional specialised equipment; particularly if they have reduced visual or audio communication ability. For example, some deaf people can communicate using speech, and most (English speaking) deaf people will use signed English or British Sign Language. However, sign language is not universal, so a deaf Japanese person is unlikely to be able to easily communicate with a deaf European person. In addition, English is notoriously difficult to lip read and, of course, this method is not generally possible for telecommunication, where the communicating parties typically cannot see each other; even if they can see each other (through video communication for example) lip-reading will often not be possible.

Similarly, for blind people, although speech is the main way they communicate, they miss out on body language that can provide the majority of clues about the emotional state of the person who is talking.

People who are suffering conditions that lead to mental impairment may find communication using standard audio/visual techniques difficult. Using touch as a communication medium allows such people to communicate with relative ease. There are different types of touch that can be used, and the intensity and/or duration of the touch may also convey specific messages between the communicating parties.

A communication system which does not rely on audio or visual communication may be particularly useful for these people. Touch, in particular, has been found to improve a subject's immune system, calmness and resilience to stress. Touch has also been found to increase trust, co-operation and a sense of support/compassion from the people around them. It does so by activating the orbitofrontal cortex, releasing oxytocin popularly known as "the love/trust hormone".

The digital touch feature in the Apple watch, for example, allows a wearer to send a representation of their heartbeat (as sensed by the watch) to a wearer of a similarly enabled device to be received as a vibration at the device.

According to the invention there is provided a communication method for use by a plurality of users to provide an indication of a status of a user, comprising the steps of: a) a user providing information about a first status indicator b) said user providing information about a second status indicator; c) generating a vibration pattern representing a variability measure based on said first and second status indicators wherein said vibration pattern comprises a series of beats, each beat comprising at least two pulses, wherein the pulses within each beat are spaced at a first frequency, and said beats are spaced at a second frequency, d) transmitting the vibration pattern providing information on said variability measure to a third party, wherein said vibration pattern changes by varying said first and/or said second frequency, as said variability measure changes.

Preferably, said third party is one other or more of said plurality of users or alternatively is a server or other computer storage or memory device.

Preferably, the intensity of one or more pulses of said vibration pattern can be adjusted by said user to provide additional information about said variability measure. Preferably, the intensity can be adjusted to be within a range between zero and a maximum intensity.

In an embodiment of the invention when a user changes said first status indicator the separation between pulses of a beat changes, and when a user changes said second status indicator the separation between subsequent beats changes.

Further preferably said user provides first and second status information into a mobile device or other computer/handheld/wearable device or suitably enabled sensor and said third party receives information on said variability measure on another mobile device or other computer system/handheld/wearable device, or suitably enabled sensor.

In an embodiment of the invention each user of said method can set a unique identifier which identifies said user to all other users of the method. Preferably, the unique identifier is a unique vibration pattern, alternatively it may be a unique audio transmission. In a preferred embodiment of the invention the audio transmission maybe generated from a recording of the voice of the user. In some cases the identifier may be a combination of the vibration pattern and an audio transmission.

Preferably, said user provides information on said first and second status of said user to a third party and the method further comprising the step of said third party using said method to transmit information on their variability measure to said original user.

Further preferably, said one of said first or second status information is information about a user's energy status, and said other of said first or second status indicator is information about a user's emotional status.

In an embodiment of the invention, a user can transmit an event vibration pattern representative of an event to another user of said method; said event vibration pattern being different from said variability measure. Preferably, an event vibration pattern comprises a series of pulses.

Further preferably, at least one of the pulses has standard intensity and at least one of the pulses has high intensity. Alternatively, each of the pulses of said event vibration has an intensity that lies between zero and a defined maximum intensity. Alternatively, all of the pulses may have the same intensity.

In some cases, said event vibration pattern has a defined duration and is transmitted once, alternatively, said event vibration pattern has a defined duration, and is transmitted 2 or more times between said users, with no pause between subsequent transmissions. Multiple transmissions of an event vibration are defined by user selection or by continued touch.

Preferably, said defined duration is at least 2 seconds. Yet more preferably said defined duration is at least 10 seconds.

In a further preferred embodiment of the invention the method also comprises the steps of: said first user tracing a first path on their device; said device recording the x-y coordinates of said path, transmitting said x-y coordinate information to a device of said second user; recreating and displaying said first path on a device of said second user.

Preferably, said first path is a continuous path. Alternatively, said first path may comprise one or more discrete sub-paths.

Preferably, said x-y coordinate information is transmitted to a plurality of other users and recreated and displayed on the device of each said other user.

Further preferably, a second user receives x-y coordinate information from a plurality of other users, and each said first path for each other user is displayed to said second user, using different display means to distinguish between paths for other users. In an embodiment of the invention, said plurality of first paths for different users are displayed using a different colour for each user.

Further preferably, said recreated and displayed first path is scaled according to the display area available on the device of the receiving user.

In an embodiment of the invention, each user is provided with a status screen showing their current status profile, wherein the colour and or pattern background of the screen provides visual information about the current status of the user. Preferably the status screen includes additional information about the current status of the user, and the additional information may include icons, patterns, text or other visible images.

In a further preferred embodiment of the invention each user is provided with a contact screen on an enabled device, where the screen shows all the users current contacts and the icon for each contact will include information about the current status of said contact. Preferably, the contact icon is updated as the status of said contact is updated.

Preferably, said contact icon is provided with a specific colour feature that can identify said contact in their communications with other users. Further preferably, the colour feature is a coloured border around said icon.

Further preferably a user can review any or all historical events, status updates and interactions with other users for a defined time period. This time period may be between 1 day-1 year.

Figure 2:
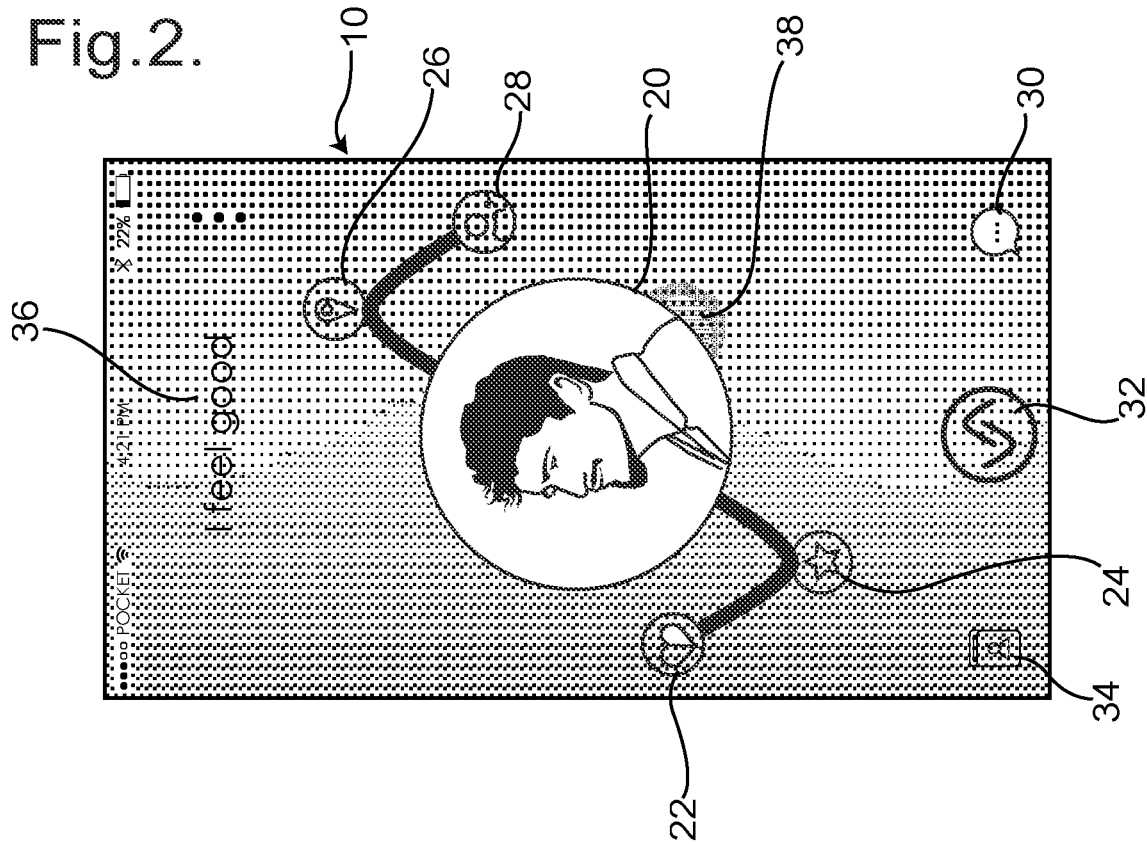
Figure 3A:
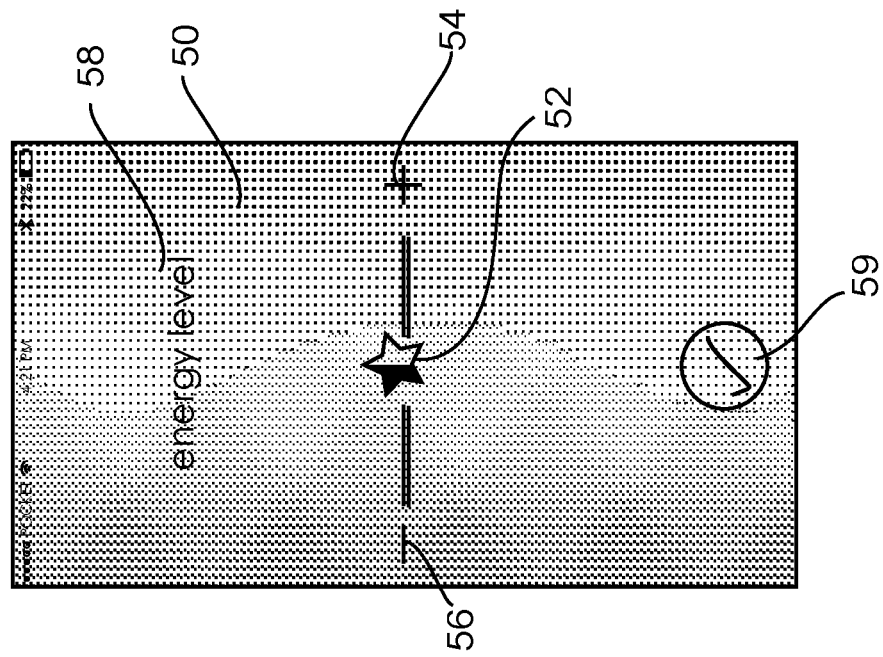
Figure 3B:
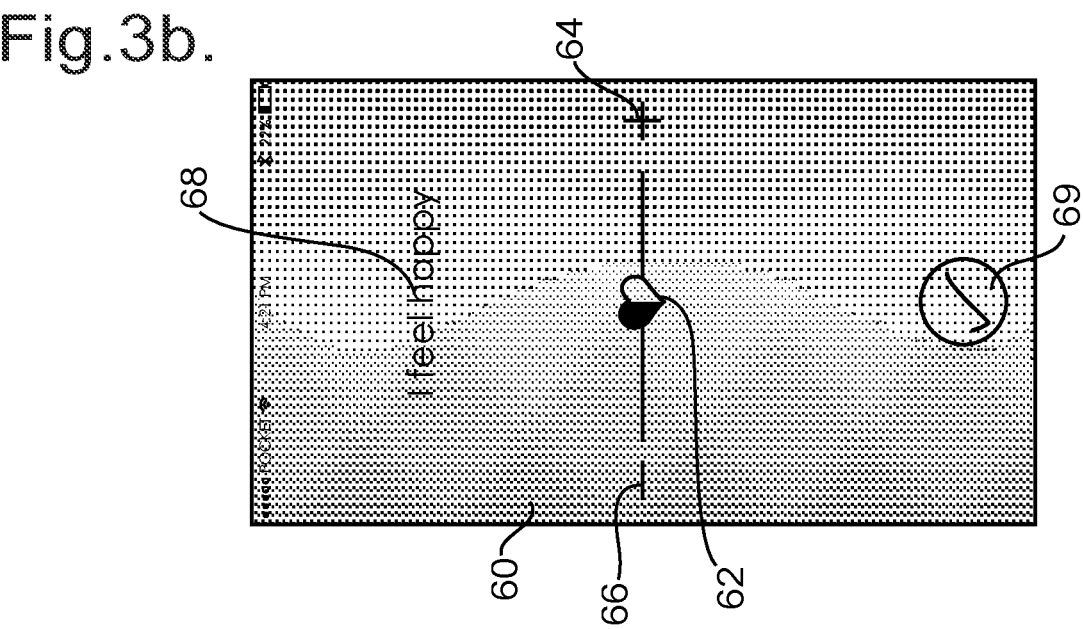
Figure 4A:
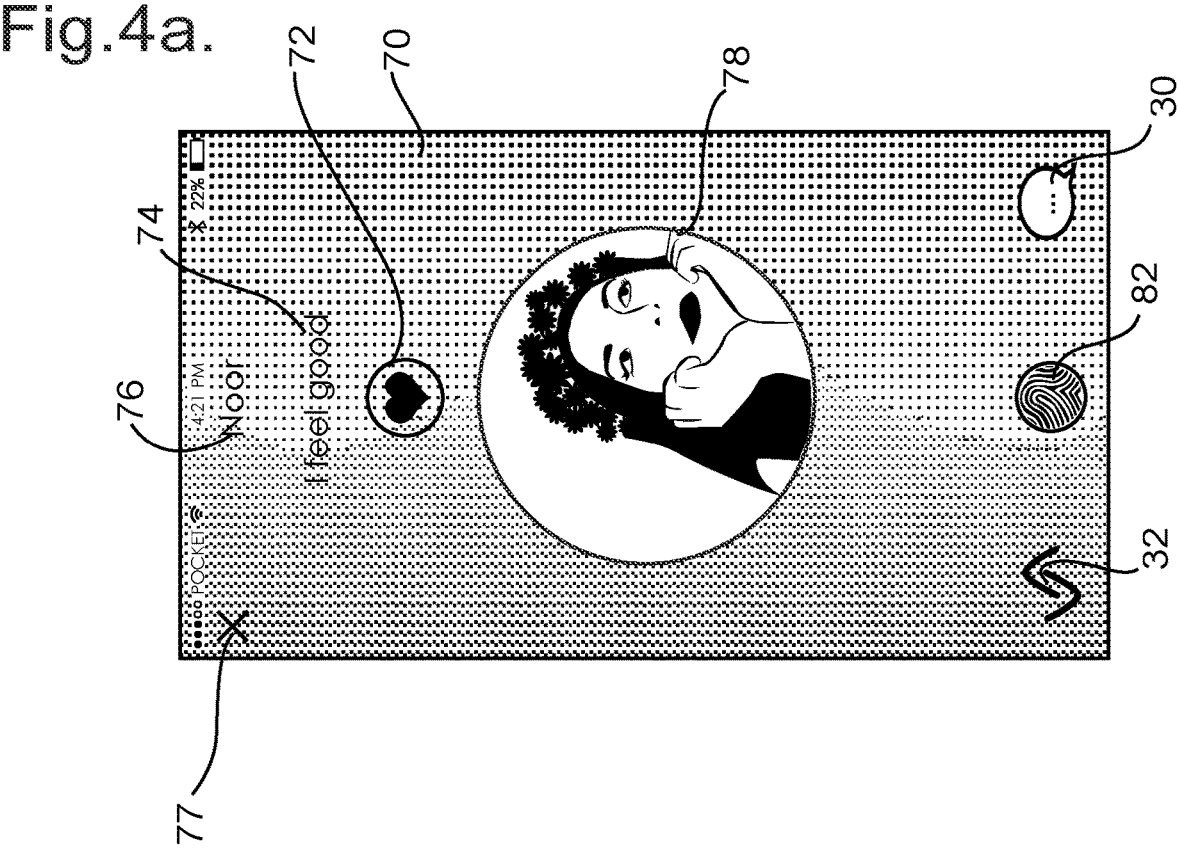
Figure 4B:
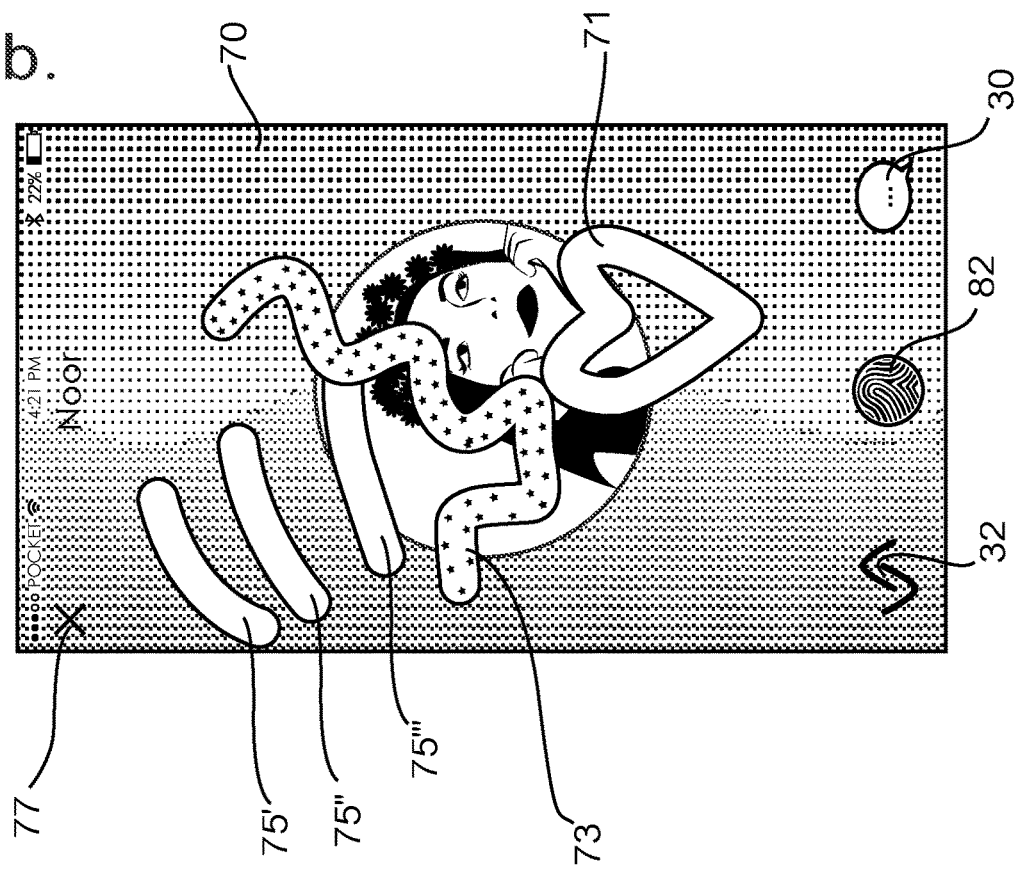
Figure 5A:
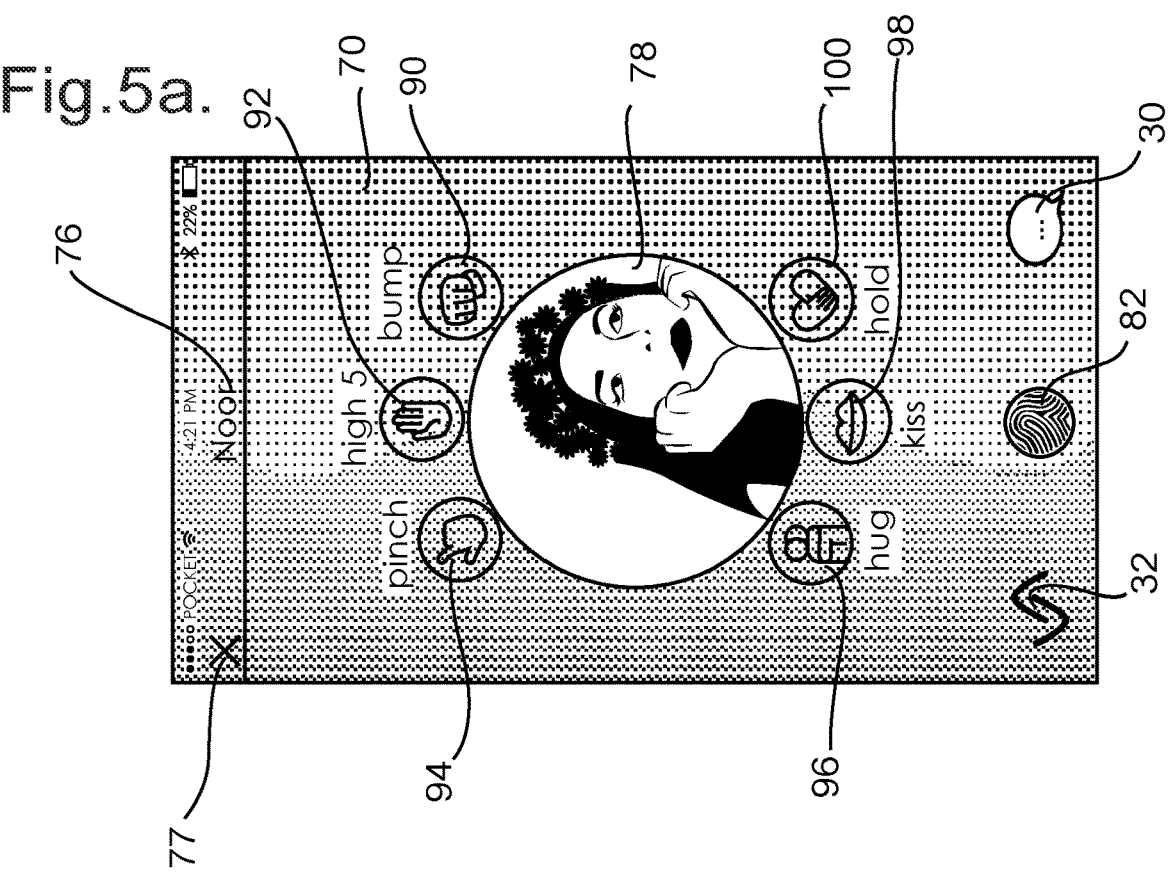
Figure 5B:
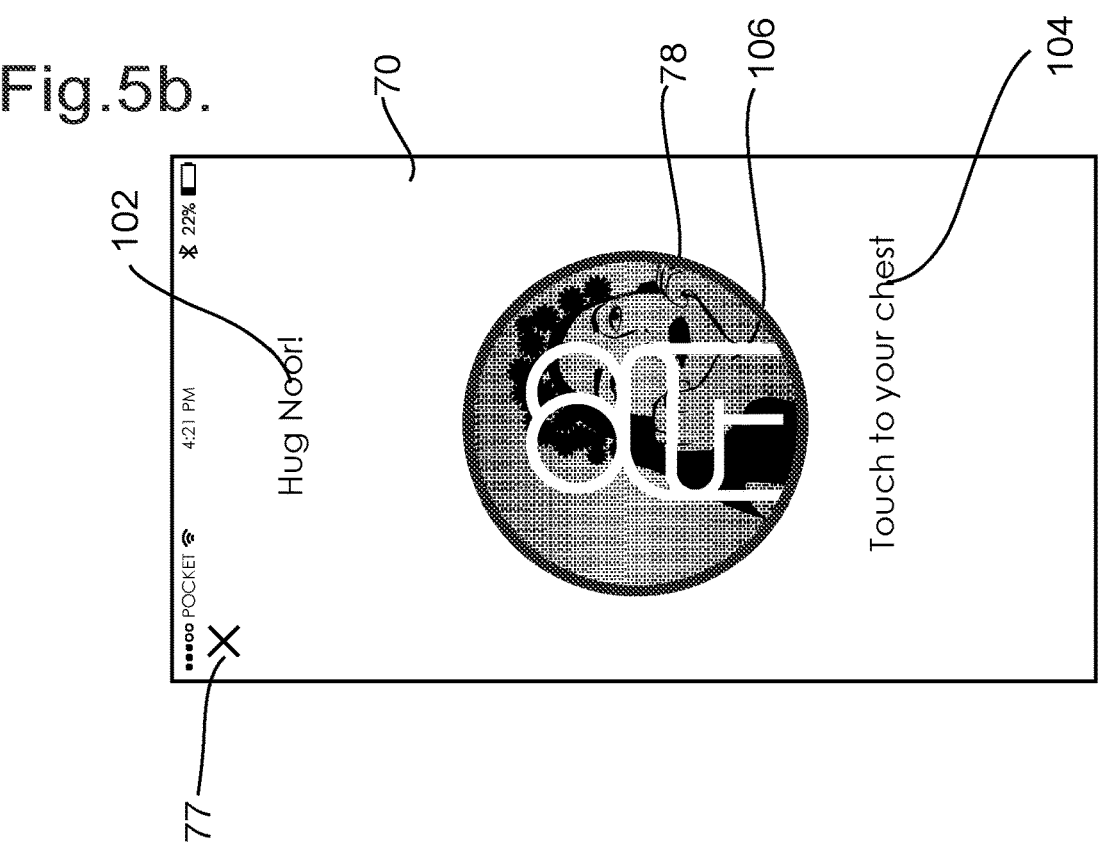
Figure 6A:
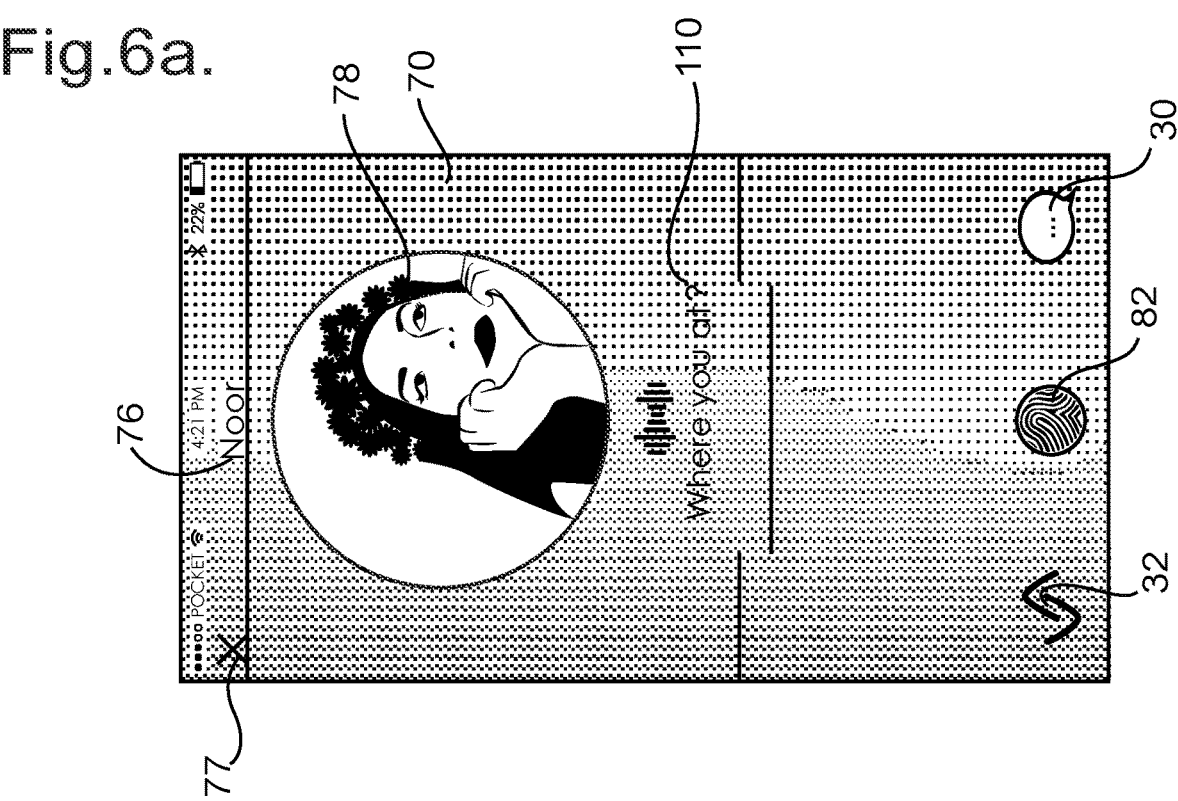
Figure 6B:
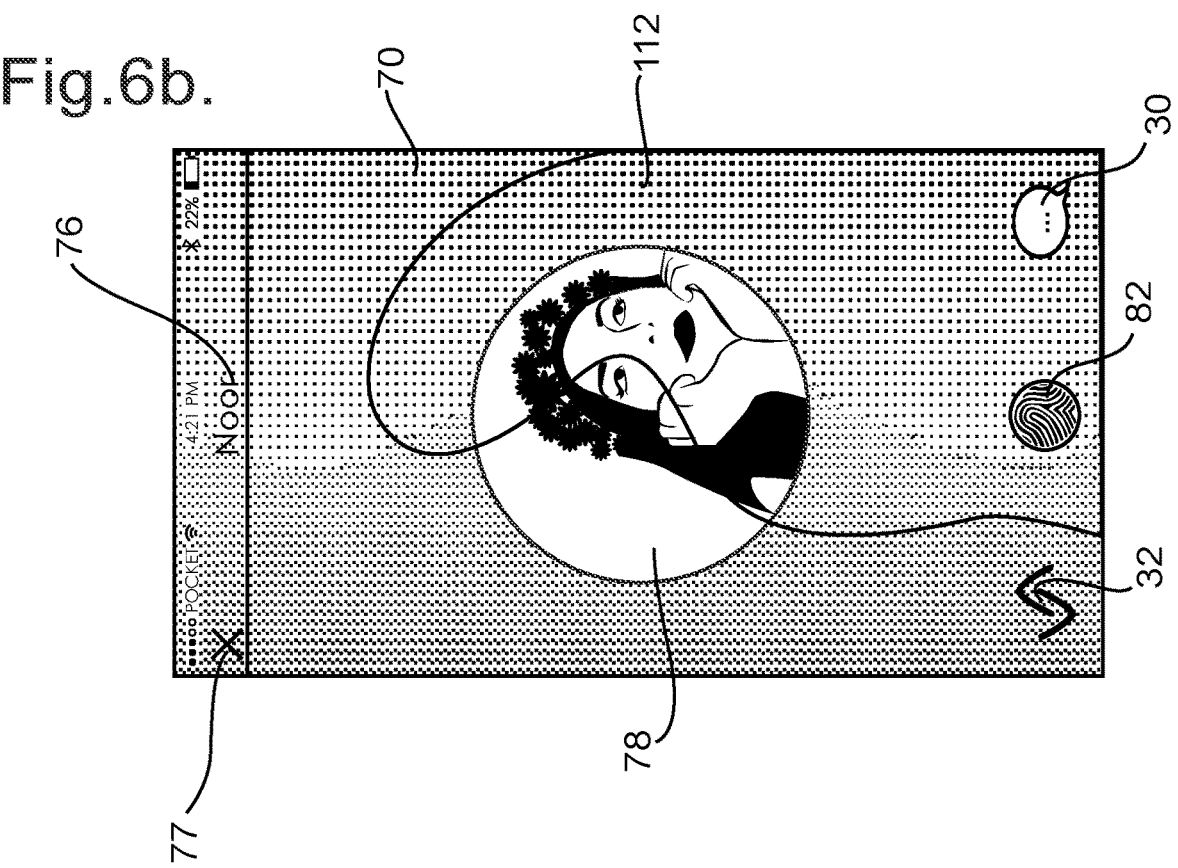
Figure 7:
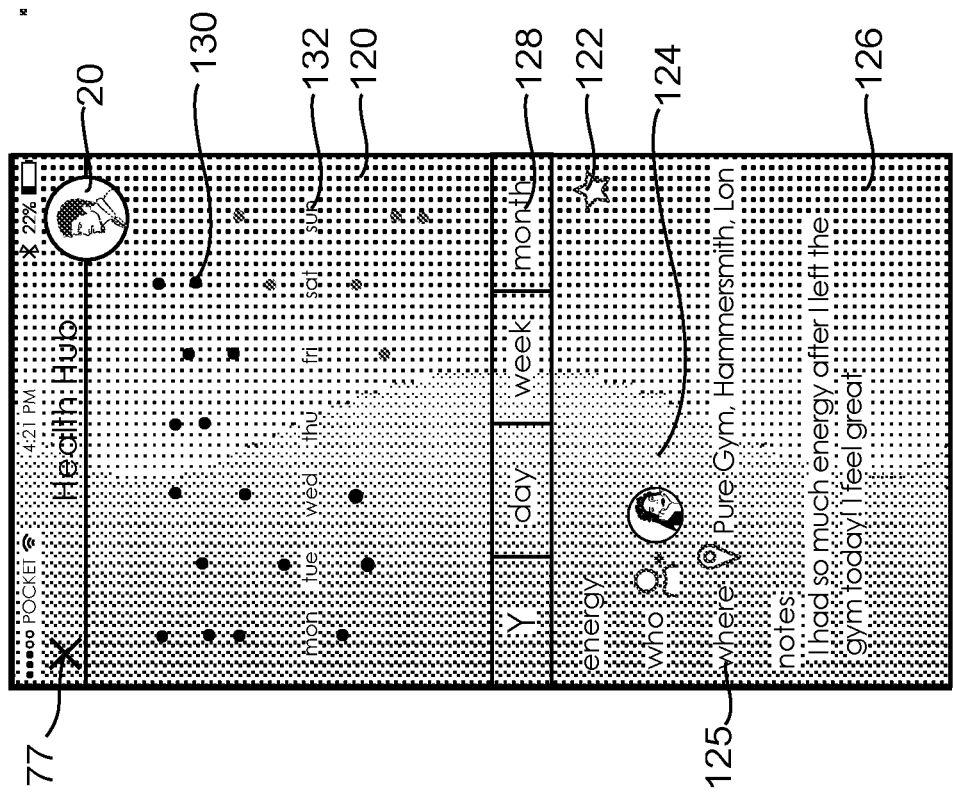
Figure 8:
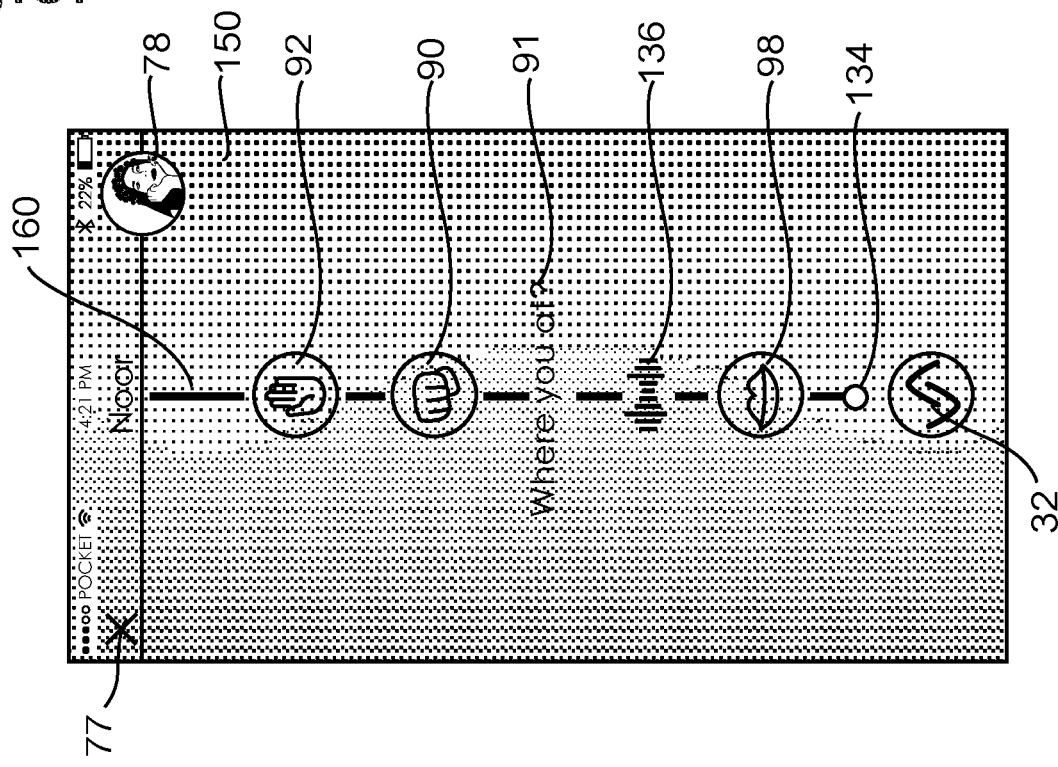
Figure 9:
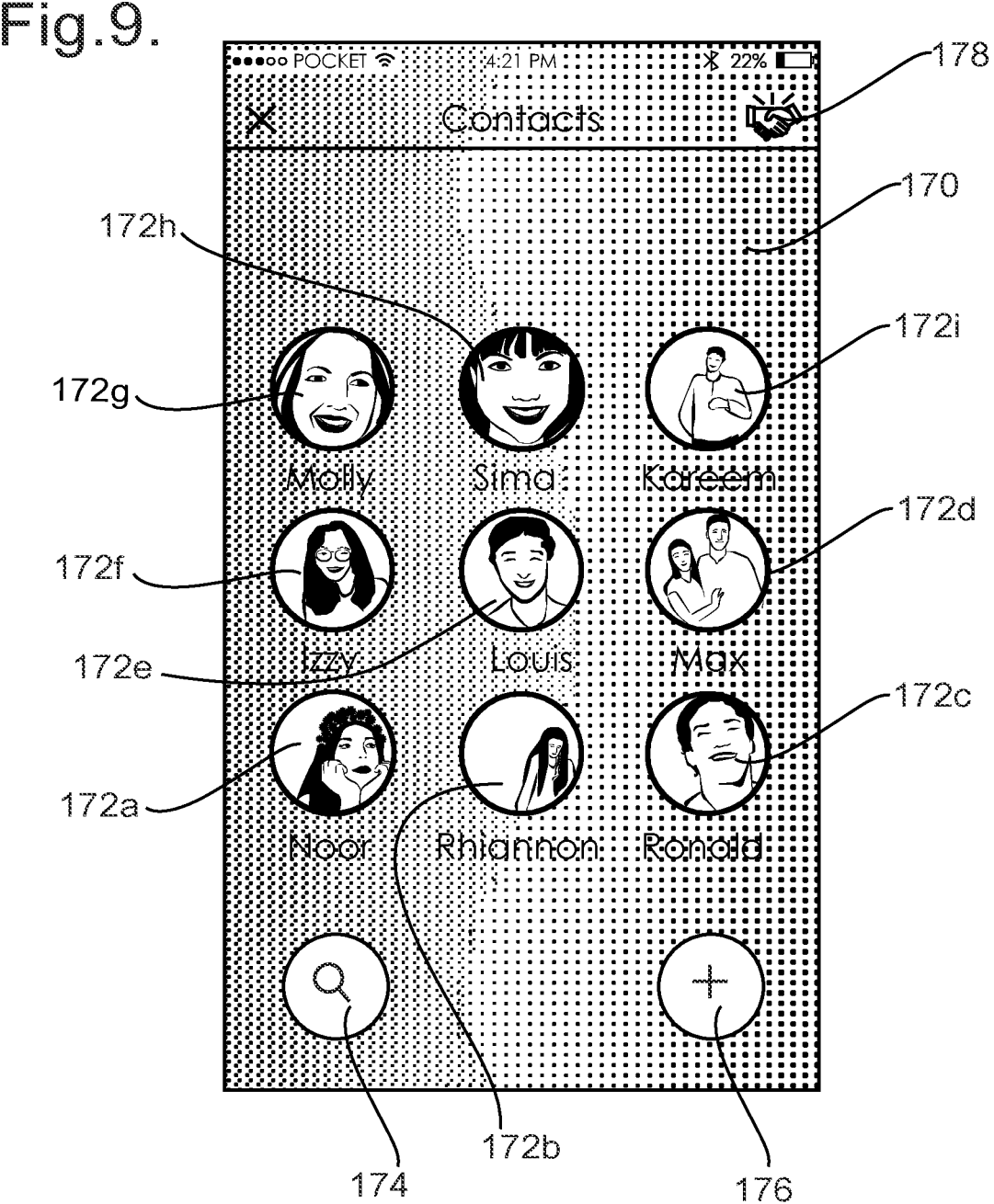
Figure 10:
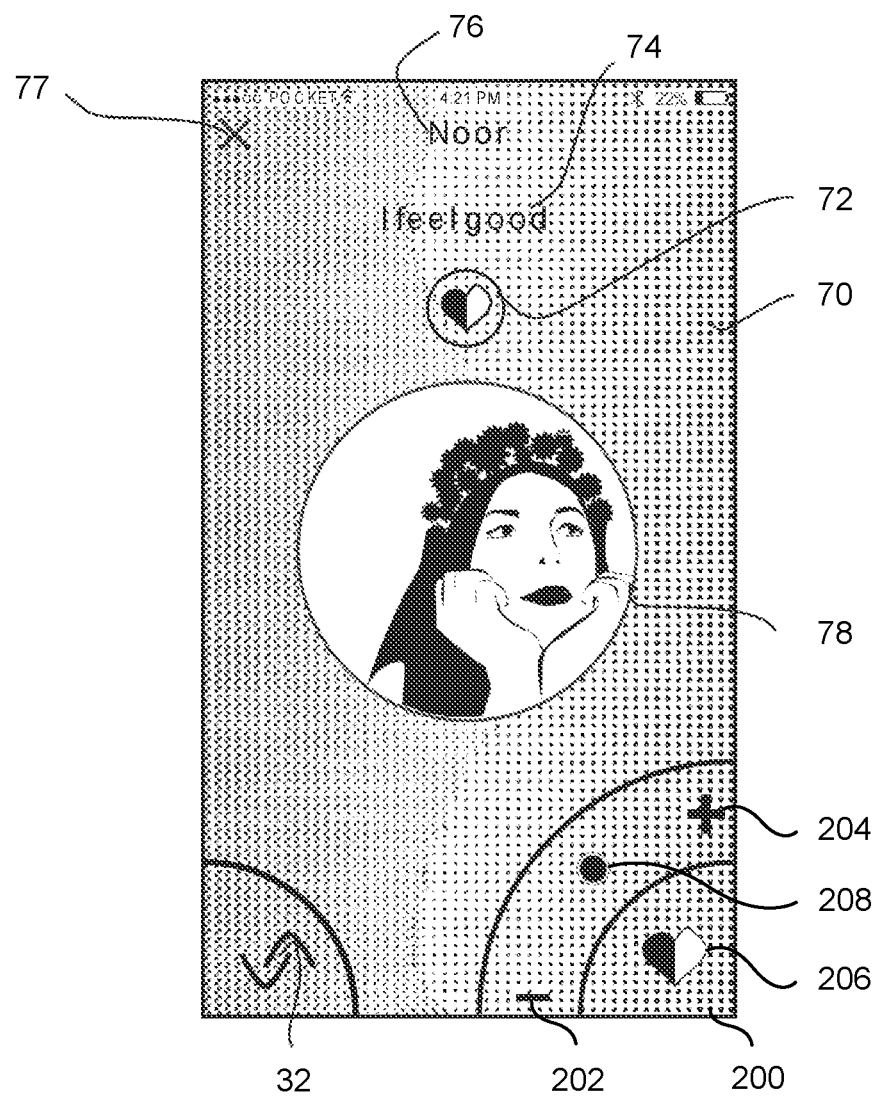

The present invention will now be described in more detail, by way of example only with reference to the accompanying figures in which:

FIG. 1 shows an energy/mood graph;
FIG. 2 is the home screen showing a user's profile;
FIG. 3(a) shows the screen for setting energy status;
FIG. 3(b) shows the screen for setting emotional status;
FIG. 4(a) is a screen showing another users current status
FIG. 4(b) shows the screen of FIG. 4(a) with user interaction;
FIG. 5(a) is the user screen showing various interactions available with the displayed user;
FIG. 5(b) is a user screen showing a specific event interaction with the displayed user;
FIG. 6(a) shows a user's profile above a messaging screen;
FIG. 6(b) shows the change in screen as a voice message is sent to the displayed user;
FIG. 7 shows the health hub of the user;
FIG. 8 shows the interaction history between two users;
FIG. 9 shows the current status of all of a user's contacts; and,
FIG. 10 shows the screen configuration with an alternative input system.

The communication of this system is based on the use of vibrations, to replicate the feeling of touch between parties who may be apart. The vibration pattern can be used to identify any of the users of the method, and also to transmit information about a user's status.

FIG. 2 shows the home profile screen 10 on an interactive mobile device for a user 1 of the communication method. The method is preferably implemented through an interactive app on a suitable mobile device such as a mobile phone, or tablet computer, but may also be implemented through a range of devices, such as watches and other wearable devices, suitably enabled products such as soft toys (for use by a child etc.). In all cases, the method will lead to a vibration pattern being transmitted by the device of user 1 to the receiving device of another user. This vibration pattern will provide specific information to the user of the receiving device about user 1. The home screen 10 consists of a central profile picture 20 of user 1, and indication of the user's current emotional status 22, as well as an indication of the user's energy level 24, a location indicator 26 and friend indicator 28 showing the people the user is currently with. As shown in FIG. 2, the emotional status indicator 22 is half filled, reflecting the current emotional status of the user. This is further reflected in the background of the screen, which is coloured in two different colours, blue and red, reflecting that the emotional status is half filled. The indicator 38 (partially hidden under profile picture 20) is a tab to access the health hub (described in FIG. 7 later). It should be noted that all users can check on the health hub of another individual—either at this stage of initial communication or at any other time during their interactions. Of course, this requires that users have set permissions to allow all (or perhaps only some) other users to have access to the health hub for that user. This is particularly useful if the user is in a severely detrimental state of mental health e.g. with Alzheimer's or depression and requires more constant/consistent attention. If they have provided the appropriate permissions then other users can freely monitor their emotional state without the need for continually questioning or interrupting the original user. Conversely, if a user normally regularly updates their status, and this changes, and they do not update the status for a period of time; this may raise alarm among other users who may try to contact the original user by live interactions or by other means.

Overall status update tab 36 provides a general user status update. The update is normally a text or graphical or image input, but in some cases audio input may also be used. Tab 34 provides access to a user's contact list, tab 32 allows the current user to send a status update of a specific vibration pattern, indicating their current mood to any of their contacts, and tab 30 allows the user 1 to access their message and interaction history (text or audio, emotional status, event interactions etc.) with all of their contacts. The overall background colour of and additional non-verbal cues on the screen provide an indication of the current status of the user 1, specific additional screen embellishments are described in more detail later in this specification. If the background is more filled with blue then user 1 is generally more emotionally negative. By contrast if the user is feeling more emotionally positive the background will become more red in colour. Typically, the emotional status indicator itself will also be filled to correspond to the overall emotional status of the user—in this case, the icon 22 is half filled to correspond to the colour of the background of the home profile. As the emotional status changes, the fill level of the icon will change accordingly.

The user 1 is able to set a custom vibration pattern that will uniquely identify them to all other users of the system. Typically, this will be sent before any other interactions between the users, but may be sent at any time during interaction between users. This identification vibration pattern is a totally separate and different vibration pattern to that for the user status updates to be described below, and will typically be used at the start of all communications between users. The identification vibration pattern will consist of a specific arrangement of pulses for each user, that is preferably created by the user, comprised of an assortment of "x", "X"and"." pulses where "x" represents a pulse of standard intensity, "." is a pulse of zero intensity and "X" is a pulse of high intensity. Of course, the intensity of the pulse may vary from zero intensity up to a defined maximum intensity, and the pulses may have any intensity in this region.

In this way the contacted user is able to easily identify the user who is contacting them, simply by the received vibration pattern and/or vibration intensity that identifies the contact. No other identification is needed, but for example, a sound associated with the original user may also be provided (described in more detail later), as well as a colour corresponding to the original user, and/or any other identifying attributes the original user may have chosen. Once the two users in contact have exchanged the contact/identity information it is then possible for them to provide the status updates described below, to tell each other how they are feeling, and to have further interactions as described below. This allows users to easily exchange information without requiring the exchange of any audio or visual information, as the transmitted information is a vibration pattern that is entirely touch based and so can be used by people with limited audio or visual processing capability, or by those who may have conditions such as Alzheimer's disease or various types of dementia. In a group situation, then user 1 may send out a vibration pattern update simultaneously to a number of contacts (rather than just to one contact, or to several contacts sequentially). This will allow for group interactions at the same time.

FIG. 1 is a graph showing energy level and positivity (emotional status). A user can provide information on both of these via a mobile device application, and this can be converted into a variability measure that is transmitted as a vibration pattern to another user of the system. In some cases, if the user is wearing a suitably enabled wearable device or garment, information on one or more of energy level or positivity (or any other suitable status indicator) may be provided by automatically monitoring the user via a sensor within the wearable device or garment). The neutral position is the centre of the graph (the zero point where the axes cross). At this point, a user will have a standard heartbeat "variability" measure with associated vibration pattern. This is typically represented as:

x.x. . . . x.x. . . . x.x. . . . x.x. . . .

where "x.x" represents a single beat, of standard intensity. In this case "x" represents a pulse of standard intensity, "." is a pulse of zero intensity and "X" is a pulse of high intensity. For this standard vibration pattern, a single beat is therefore a pulse of standard intensity followed by a pulse of zero intensity and then another pulse of standard intensity (three pulses in total forming a single beat). Each beat for the standard vibration pattern is then separated by three pulses of zero intensity, thus forming a regular repeating vibration pattern for the "variability" measure.

The pattern "variation" is the time between each beat in the vibration pattern or "variability" measure. For the standard pattern above, if a beat is x.x (pulse of standard intensity followed by a pulse of zero intensity and then another pulse of standard intensity), the time between beats is . . . (three pulses of zero intensity), as the energy level of the user increases (moves up the vertical axis) the pattern variability will decrease and the vibrational pattern will change to:

x.x..x.x..x.x..x.x. . . .

In this case, the separation between each "x.x" beat has dropped from ". . . " (three pulses of zero intensity) to ".." (two pulses of zero intensity), whereas if the energy level has decreased (down the vertical axis) then the separation between the beats will increase to more than three pulses of zero intensity. Generally, the separation between beats will be the same, so the vibration pattern is regular, but in some cases the number of zero intensity pulses between beats may change, producing an irregular vibration pattern. For example, if a user is changing their energy level, there will be an irregular pattern during the change of status, but then the pattern should settle down to a regular repeating pattern For the other measure of user status, the emotional status or mood, as the happiness/emotional positivity of the user increases (moving to the right on the horizontal axis) the pulses within each beat will get closer together, so each pulse will go from "x.x" (standard intensity pulse followed by zero intensity pulse followed by standard intensity pulse) to "xx" (two consecutive standard intensity pulses with no zero intensity pulse between). Assuming the energy level of the user is unchanged (as compared to the neutral position) the overall beat sequence will change from:

x.x..x.x. . . x.x. . . .x.x. . .

to xx. . . xx. . . xx. . . xx. . .

That is, there is no zero intensity pulse between the standard intensity pulses of each beat. However there are still three zero intensity pulses between each beat (of two standard intensity pulses), to produce a regular repeating vibration pattern.

Conversely, as the happiness decreases (assuming energy level is unchanged) the beat sequence will become:

x..x. . . x..x. . . x..x. . . x..x. . .

In this case a beat is now "x..x", that is a standard intensity pulse, followed by two zero intensity pulses, followed by a standard intensity pulse. Each beat in the vibration pattern is separated by three zero intensity pulses and a regular repeating pattern of beats/separation is produced.

With regard to the vibration patterns representing "variability" measures that are produced in this invention, the invention does not merely shift the tempo of a generalised vibration in a single direction. Instead the invention allows for a shift of a repeated vibration pattern in two different ways to convey two distinct indicators. More specifically, you can adjust (increase/decrease) the frequency between non-zero pulses within beats, and also the frequency between beats (increase/decrease). These adjustments are distinct and each can be adjusted independently of each other. These are shown in the example below:

Example pattern before shift: x.x. . . x.x. . . x.x. . .

This vibration pattern comprises three beats x.x, with each beat separated by ". . . " (three zero intensity pulses). Each beat comprises a pulse "x", a zero intensity pulse ".", and another pulse "x).

Consider the initial vibration pattern: x.x. . . x.x. . . x.x. . . where the frequency between the non-zero pulses within beats is increased and the vibration pattern becomes: xx. . . xx. . . xx. . .

In this case, the number of pulses between beats is unchanged, but the zero intensity pulse in the middle of each beat has been removed, so the beat pattern is now "xx" rather than "x.x"

Alternatively, the vibration pattern may be adjusted by decreasing the frequency between pulses within the beats to become: x. . . x. . . x.x. . . x. . . x. . .

In this case, the number of pulses between beats is unchanged, but there are now three zero intensity pulses in the middle of each beat, rather than just one, so the beat itself is now "x. . . x" rather than "x.x"

In another alternative, the vibration pattern is adjusted by changing (increasing) the frequency between beats to become: x.x.x.x.x.

In this case, the beat is unchanged from "x.x" but there is now only one zero intensity pulse between each beat, rather than three zero intensity pulses Alternatively, the frequency between beats may be decreased, leading to the following vibration pattern: x.x. . . . .x.x. . . . .x.x Of course, other vibration patterns may also be possible according to the change in the energy/emotional status of the user. Examples of custom pulses may include:

(x.xx.xxx).(x.xx.xxx). . . (x.xx.xxx).(x.xx.xxx). . . (x.xx.xxx).(x.xx.xxx). . .

With decreasing positivity, this becomes:

(x.xx.xxx). . . (x.xx.xxx). . . (x.xx.xxx). . . (x.xx.xxx). . . (x.xx.xxx). . . (x.xx.xxx). . .

Or:

(xxx.xxx..xx).(x.xxx.xxx). . . (xxx.xxx..xx).(x.xxx.xxx). . . (xxx.xxx..xx).(x.xxx.xxx). . .

With decreasing energy, this becomes:

(xxx.xxx..xx).(x.xxx.xxx). . . . . . (xxx.xxx..xx). (x.xxx.xxx). . . . . . (xxx.xxx..xx).(x.xxx.xxx). . . . .

In addition, it is possible to change the intensity (increase or decrease) of any of the beats or pulses in the vibration as an additional indicator of how the user is feeling, the user may change the intensity of all the beats/pulses in a vibration pattern, or only of some of the beats/pulses. This change in intensity can, for example, indicate the importance or urgency of a certain energy/emotional status of the original user (updating their status) to another user. In one embodiment of the invention, the original user (who is changing their status) will hold down the heart icon 62 to change the intensity of the vibration, from standard intensity to high intensity for example (or to any other defined intensity from the range zero to maximum), and consequently the urgency of the communication between the parties. Effectively, this will provide a third status indicator as to the present status of a user. This may also increase the size of the heart icon 62 as displayed in FIG. 3(*b*). Accordingly a wide range of different vibration patterns and intensities may be possible. A simplified representation of the vibration patterns for transmission is as follows:

$(abac)^n = (abac)_1 (abac)_2 (abac)_3 \ldots \ldots (abac)_{n2}(abac)_{n1}(abac)_n$ In the above string "a" represents a non-zero intensity pulse (x/X)

"b" represents the zero intensity pulse between non zero intensity pulses

"aba" represents a beat and

"c" represents the zero intensity pulses between beats

Parameter "a" will change depending on custom indicator e.g. unique user identifier.

Parameter "b" will change depending on the user's positivity/emotional status level.

Parameter "c" will change depending on the user's energy level

Use of the vibration patterns as described above allows people to easily transfer information between each other without the need for words or other auditory means, but using other sensory methods, such as touch and vision. Of course, the system may also use audio methods for transmission of information, in addition to the vibration patterns. For example, the audio transmission may be an audio transmission of the same pattern as the vibration patter, to reinforce the message of the vibration pattern. Alternatively, the audio transmission may be a separate transmission, but communicating the same information as the vibration pattern. In another alternative, the audio transmission may provide supplementary information to the vibration information, for example a voice message or other audio transmission.

FIGS. 3(*a*) and 3(*b*) show the screens used to input the energy 50 and emotional 60 (happiness) levels of the user on a suitably enabled mobile device.

The input process for the energy level is as follows (FIG. 3(*a*)). The star 52 is shown in the centre of the screen. This represents neutral user energy level status and the star is shown as half coloured. The background colour of the screen is related to emotional status (described below) and will not change as the energy level is adjusted. The user moves the star 52 to the left 56 of the screen if they have less energy and to the right 54 if they have more energy. As the star moves to the right the star will get more filled in, and as it moves to the left the star will be less filled in. In addition, as the monitor is slid from left to right for the energy level indicator 52 the embellishment of the overall background will change to reflect this. In a preferred embodiment of the invention, as the energy level increases, the background will be provided with coloured stars, these will increase in size/brightness/intensity/number as the energy level input by the user increases, and will decrease as the energy level input by the user decreases. When the user has zero energy, there will be no stars in the background. In addition, the overall brightness of the screen/device can be adjusted (brightened/dimmed) to reflect the changes in the user's status. Adjusting the energy and/or emotional levels will create a visual indication of the user's status, to complement the vibration patterns which provide a tactile representation of status. Together, these provide a non-verbal sensory method of communication.

The input process for emotional levels is similar, using the screen shown in FIG. 3(*b*). The heart 62 is in the centre of the screen. This represents neutral status and the heart 62 is shown as half coloured. The background colour of screen 60 currently reflects the central position of the heart icon 62 on the axis—the screen is coloured in one colour on the left hand side of the screen (blue) and another colour on the right of the screen (red). The user moves the heart 62 to the left 66 if they are less happy and to the right 64 if they are happier. As the heart moves to the right it will get more filled in, and as it moves to the left it will be less filled in. In addition, as the heart 62 is slid from left to right the overall background colour of the screen will change. When the user is happier the background colour will be dominated by red, whereas if the user is less happy the background will be blue. There will be a gradual colour change from blue to red as the status moves from left to right. Of course, the colour-varying screen may also be provided with stars related to energy levels as discussed above. In addition, the user may also add a keyboard based status update displayed at line 68. This is normally a text or graphical or image input, but in some cases audio input may also be used.

The adjustments create a visual indication of the user's energy level, and the vibration patterns provide supplementary tactile information. Together these provide a sensory, non-verbal method for communication, that may also be supplemented by other audio (verbal or other sounds) communications as described above.

Alternatively, the touch screen may be configured to allow users with restricted mobility to input energy/happiness levels where they cannot use the slide bars discussed above and shown in FIGS. 3(*a*) and 3(*b*).

In this case, as shown in FIG. 10, a thumb board 200 may be provided on the screen of the device, typically this is a quarter-circle placed on the bottom left or right-hand side (as shown in the figure) of a screen, according to the user preference All of the other features of this figure are as previously described. The scale for the quarter circle will run from negative 202 to positive 204 (0 to 100 or any other metric of your choice) and from bottom-left of the quarter-circle to top-right (or vice-versa),a user can then input their energy/emotional levels intuitively, by moving around the circumference of the quarter circle 200, without moving their hand from the usual position. Icon 208 shows the current position within the circle relating to emotional state, and when this icon reaches the top of the quarter circle the heart icon 206 will be filled as shown. Use of this thumb board enables a much more simple way for people, especially with physical disabilities, to use the invention.

For both inputs, once the user has selected the energy level or emotional level, they will press on tick 59 (for energy level) or 69 (for emotional status) as displayed on the status screen 50 or 60 of user 1 to confirm that the status update they have just set is correct, and this updated status can be provided to other users of the system, as the updated status will be displayed on the user's home screen.

When the user 1 interacts with another user of the system, (typically after transmitting the identification vibration pattern as discussed above) the overall background for the original user 1 will be transmitted to the receiving user so that they have an indication of the initial mood of the original user 1. If the status of user 1 changes the updated status will be re-sent to the other user, and typically the background of screen 70 will be representative of the average status of the original sender and the recipient. This will allow both parties to exchange status updates without requiring any text or audio interchange. The only information transmitted is the vibration pattern and/or the overall background of the users' screen, that is the colour and any associated colour change over the screen, as well as any stars or other embellishments or decorations that can provide useful indication of the users' current emotional or energy status. In addition, the type of sound used along with the vibration may also change. For example, when the identification vibrations are transmitted, the system is in an anticipatory stage, and has sound of a particular type associated with it. When the system is live (so both the sender and recipient are live), and status vibration messages are exchanged, the accompanying sound may be different.

This change in the vibration pattern is a key feature of this invention. At the heart of the invention, the transmission of vibration patterns allows for the transfer of information about emotional state from one person to another. This is not simply the same as sending a static, unchanging and unreactive vibration pattern with a defined meaning, instead this invention incorporates a live element, where the vibration patterns can change to reflect the circumstances of the sender. Whilst this is initially described with respect to a portable electronic device such as a mobile telephone, it is applicable to any suitably enabled device, with or without a screen, such as wearable products or jewelry for example.

Example 1

Subject A and B intend to communicate via the exchange of vibration patterns to provide information on their status. Initially there will be an anticipation period as the communication is set up. The following steps occur during the anticipation period:
1) Subject A starts a communication with subject B that will require exchange of vibration patterns to provide status information
2) subject A sends a signal vibration pattern to subject B, to indicate that A is live on the system. In this case the vibration pattern is x. . . x. . . x. . .
3) Subject B receives signal vibration pattern: x. . . x. . . x. . . from subject A The next stage of communication is known as the "live" period, with interaction between subjects A and B. This stage has the following steps:
4) Subject B accepts the communication from subject A, thereby acknowledging their presence.
5) Upon acceptance of the communication, the signal vibration pattern will change and subjects A and B will both experience a new vibration pattern: x.x. . . x.x. . . x.x. . . . This indicates that A and B are now communicating together.
6) Subject A knows that subject B has accepted their presence in the communication. Subject B also knows subject A is still present in the communication.
7) If subject B rejects communication with subject A, or subject A is no longer present in the communication, the vibrations between the parties will be discontinued.

Example 2 (Including Unique Vibration Pattern ID)

As described above, there will be an anticipation period as the communication is set up. The following steps occur during the anticipation period:
1) Subject A starts a communication with subject B that will require exchange of vibration patterns to provide status information
2) Subject A sends their unique ID vibration pattern to subject B. In this case, the vibration pattern is x.xxx.x. . . x.xxx.x. . . x.xxx.x. . .
3) Subject B receives the vibration pattern: x.xxx.x. . . x.xxx.x. . . x.xxx.x. . . from subject A The next stage of communication is known as the live period, with interaction between subjects A and B. This stage has the following steps:
4) Subject B accepts the communication from subject A, thereby acknowledging their presence, subject B also presents themselves to subject A
5) Subjects A and B both experience a new vibration pattern i.e. B's unique ID: In this case: xxx.x.xxx. . . xxx.x.xxx. . . xxx.x.xxx. . .
6) Subject A knows that subject B has accepted their presence in the communication. Subject B also knows subject A is still present in the communication, due to the change in vibration pattern.
7) If subject B rejects communication with subject A, or subject A is no longer present in the communication, the vibrations between the parties will be discontinued.

Example 3 (with Unique ID and Vibration Pattern on User Status)

As described above, there will be an anticipation period as the communication is set up. The following steps occur during the anticipation period:
1) Subject A starts a communication with subject B that will require exchange of vibration patterns to provide status information
2) Subject A sends their unique ID vibration pattern to subject B. In this case, the vibration pattern is x.xxx.x. . . x.xxx.x. . . x.xxx.x. . .
3) Subject B receives the vibration pattern: x.xxx.x. . . x.xxx.x. . . x.xxx.x. . . from subject A The next stage of communication is known as the live period, with interaction between subjects A and B. This stage has the following steps:
4) Subject B accepts the communication from subject A, thereby acknowledging their presence, subject B also presents themselves to subject A, and presents their self for an exchange of vibration patterns 5) Subjects A and B both experience a new vibration pattern, A feels B's unique ID vibration pattern followed by an Emotional status indicator: xxx.x.xxx. . . (unique ID vibration) x.x. . . x.x. . . x.x. . . (status indication vibration pattern)

6) Subject B experiences A's unique ID vibration pattern followed by A's emotional status indicator-status vibration pattern: x.xxx.x. . . (ID vibration pattern) x..x. . . xx..x..x.. x. . . (status vibration pattern)

7) At this stage both subjects know the other subject is still present in the communication through the change in the vibration pattern they experience, they are also aware of the identity of the other subject due to having received their unique ID.

8) If subject B rejects communication with subject A, or subject A is no longer present in the communication, the vibrations between the parties will be discontinued.

Of course, it is possible for a user 1 to not transmit the identification vibration pattern as described above, but merely to transmit the status update vibration pattern to another user. In this case, the recipient will be able to identify the sender 1 when they open the application on their mobile device.

FIGS. 4(*a*) and 4(*b*) show the status update 72 for a second user, as displayed on another user's device. The second user's profile picture is shown at 78 and their contact name is shown at 76. The current status of the second user is shown at 74. As shown along the bottom of the screen, symbols 32, 82 and 30 allow the user to interact with second user 76. Symbol 32 allows the first user to set their status to transmit to the other user 76. Symbol 82 allows the original user to transmit a vibration pattern for a specific form of contact (as described later in relation to FIGS. 5(*a*) and 5(*b*)) to the user 76. The symbol 30 allows the original user to interact with the user 76, in particular if the icon is tapped, then the original user is provided with a screen to allow them to send a text message and also to view previously received interactions (text/audio messages, photographs etc.), whereas if the icon 30 is held down, the app will allow the user to send an audio message to the other user. Other communications may also be possible via icon 30.

As shown in FIG. 4(*b*) it is possible for the first user to interact with user 76 by finger tracks as shown in 75', 75", 75'''. In this figure, the first user will bring up the interaction screen 70 for a second user. The first user will draw trace 75, corresponding to three lines (75', 75", 75''') on the status screen for the second user as displayed on the first users device. The x-y coordinates for each of the traces 75', 75", 75''' will be transmitted to the device of the second user, and displayed as the same trace, in the same screen location on the device of the second user. The displayed trace will be scaled according to the display area of the receiving device to be appropriately displayed. Given the variety of different screen sizes and devices that are available, this scaling is done by picking up the properties of an individual screen size, and taking into account the ratio position of the x, y co-ordinate on this given screen. For example a first trace from the first user may simply be a single touch on the screen. For this touch the x co-ordinate is ¼ of the distance from the left hand side of the viewable area of the screen and is ⅔ of the distance up the viewable area of the screen on the device of the original creator of the message.

In this case, the second user's (the message recipient) has a device with a screen that is ⅔ the length of the screen of the first user's device, but is the same width as the screen of the first user.

Then as the first user draws a trace with specific x, y co-ordinates, these are scaled accordingly. The x co-ordinates would remain the same as width of the two screens on each device is identical, but all y co-ordinate input will be scaled down by ⅔.

Similarly, when second user inputs data, the co-ordinate will be scaled up by 3/2 for display on the device of the first user. This simple ratio translation is used to ensure the trace is displayed in the correct way on all devices, irrespective of any difference in the size/aspect ratio of the devices.

The displayed traces will also be shown in a specific colour corresponding to the original user that the trace was sent from. As shown in the figure, traces 75', 75", 75''' and 71 have the same colour and so originated from the same user. By contrast, trace 73, is shown in a different colour and therefore originated from a different user to the other traces. The colour of each trace will be specific to each user, and so the recipient will be able to identify the original sender merely from the colour of the trace that is displayed on the screen. The traces will fade from the screen after a certain time period. Typically, this will depend on the users' specific settings, but the standard fade rate may be set at 3 seconds for complete fade. This will allow for traces to fade away, and for new traces to be shown on the screen as they are generated.

In the case that the original user and the recipient touch the screen in the same position (scaled if required) at the same moment in time this will initiate a notification such as a specific vibration pattern, or an audio notification to each of the users.

FIGS. 5(*a*) and 5(*b*) show the specific event interactions that are available between the original user 1 and other user 2. FIG. 5(*a*) shows the different event interactions that are available between the original user and the other user 2. The options are a fist bump 90, a high 5 92, pinch 94, hug 96, kiss 98 or hand hold 100. The typical vibration patterns used for some of these are as follows:

Hug 96: XXXXXXXXXXxxxxxXXXxx,
Kiss 98: xxxxxXXXXXxxxXXXxxxX,
Hand hold 100: XXXxxxxxxXXXxxxXxXxX.

In all of these cases the vibration pattern is a continuous series of beats of standard/high intensity. Unlike the pattern variability described above, there are no beats of zero intensity during the vibration pattern.

Typically, each of these vibration patterns will last for 20 seconds, but for some embodiments of the invention the duration may be more or less. In some cases, a single vibration pattern as outlined above may be transmitted between users, but for other cases, the vibration pattern may loop back to the beginning and be repeatedly transmitted between the users until the sender decides to end the specific form of vibration pattern being sent to the recipient.

Fist bump 90, a high 5 92, pinch 94 have vibration patterns that are generally of shorter duration, with examples as follows:

Fist Bump 90: XXXXXxxxxx;
Pinch 94: X.X.X.XXXXX;
High five 92: XXXXX. . . xx For the fist bump, the pinch 94 and high five 92, each vibration pattern will typically last for 10 seconds. In some cases a single vibration pattern as outlined above may be transmitted between users, but for other cases, the vibration pattern may loop back to the beginning and be repeatedly transmitted between the users until the sender decides to end the specific form of vibration pattern being sent to the recipient. As before, the vibration patterns for fist bump 90 is a continuous series of beats of standard/high intensity, and there are no beats of zero intensity during the vibration pattern. By contrast, the pinch 94 is composed of high intensity and zero intensity pulses, and high five 92 has beats of zero, standard and high intensity.

Other interactions may also be available for non-touch, non-verbal communication that are not explicitly shown in the figures. Each of these possible interactions will be transmitted to the other user 2 by a different vibration pattern received by user 2 at their device. For example the following user interactions with associated vibration patterns may be used:

Laugh: X.X.xxxxxx;
(High intensity pulse, zero intensity pulse, high intensity pulse, zero intensity pulse, six standard intensity pulses with no separation between subsequent pulses)

Smile: x.xxxxxx.x;
(Standard intensity pulse, zero intensity pulse, six standard intensity pulses with no separation, zero intensity pulse, standard intensity pulse)

Wave: XxXxXxXxXx;
(Repeated pattern of high intensity pulse immediately followed by standard intensity pulse with no separation between subsequent pulses)

Wink: Xx. . . Xx. . . ;
Repeated pattern of high intensity pulse immediately followed by standard intensity then three zero intensity pulses)

Thumbs up: xxxxx. . . . .;
(five standard intensity pulses with no separation between subsequent pulses then five zero intensity pulses)

Two thumbs up: XXXXX. . . . .;
(five high intensity pulses with no separation between subsequent pulses then five zero intensity pulses)

Wagging finger: x.x.x.x.x.
Repeated pattern of standard intensity pulse immediately followed zero intensity pulse)

For these events the pulse intensity may be any anywhere in the range from zero to maximum intensity, and standard, zero and high as used above are merely examples. The users may repeat these patterns by simply holding down on the relevant icon, and the event vibration pattern will be repeated at the device of the recipient until the sender lifts the pressure from the relevant icon on their device. Alternatively, the sender or recipient may select the "X" icon 77 in the top left hand corner of the screen. This will end the current transmission between the parties.

There may also be a change in audio that is transmitted between the two parties for each of the various different interactions. FIG. 5(*b*) shows the screen that is displayed if the hug icon 96 is touched by the user to send a hug to contact 76. The profile picture 78 of the contact is overlaid with a hug icon and the text of the action is displayed at 102. Similarly the command for the user is shown at 104. When the user obeys the command they will feel the vibration pattern corresponding to hug as described above. There will be similar displays for each of the options 90, 92, 94, 96, 98 and 100.

FIG. 6(*a*) shows the screen for the viewing user to have audio, image, video based or text contact with user 76. As shown, the profile picture 78 of contact 76 will move to the top of the screen to allow for messages between the viewing user and the contact to be displayed. In this figure, the text message "where you at?" is displayed (110), with the audio trace indicated above at 110*a*. Messages will appear on the screen on a rolling basis, with older messages to be found deeper within the screen, and the messages may have either text, image, video or voice input. As more messages are received/transmitted earlier messages will go further back into the depth of the screen. The earlier messages will still be retrievable if required, for example by scrolling back through the conversation. FIG. 6(*b*) shows the change in the screen as a voice message is sent from the viewing user to the contact 76. As the voice message is recorded the screen will fill with liquid 112. The liquid will change colour according to the overall time of the voice message. As before, it is possible for user 1 to send the messages to multiple different contacts simultaneously.

FIG. 7 is a picture of the health hub screen 120 for a user 1. The particular user is indicated by the profile picture 20 displayed at the top of the screen. By selecting the picture 20 at the top of the screen, the viewing user is able to select the health hub of a contact that they wish to review—provided, of course, that the selected user has granted permission for the viewing user to review their health hub. Time selection tab 128 allows the user 20 to display information for a set time period, such as a daily, weekly or monthly. Tab 124 shows which contacts the user was with at the specific time period being reviewed, or at the time when they made a specific input into the health hub, and tab 125 shows the location of the user at the time period. Under tab 126 the user can add and review notes they added at the time about how they were feeling at that specific moment. The timeline 132 displays previous updates 130 of the user recorded over the displayed time period. These updates may be vibration patterns concerned with emotional and/or energy status, the location at that time, the people the user was with, any event vibration patterns that were received. The colour of the update icon 130 will indicate how the user was feeling at a particular time. Any icon 130 can be further selected to display additional information about that specific vibration pattern, such as energy level, emotional status, location, friends, notes etc.

FIG. 8 is the screen to allow a user 1 to see the interaction with another user 2. The profile picture 78 of the other user 2 is shown at the top right of the screen. The present moment is shown by icon 134 towards the bottom of the screen. This screen has the symbol 32 to allow the user to send a vibe update to the other contact 78. The timeline 160 shows the previous interaction between the users. The top of the screen shows the earliest interactions. In this case, there has been a high five interaction 92, then a fist bump interaction 90, followed by a text question 91, a voice message 136, and the last interaction was a kiss 98. Further interaction between the contacts is possible using the vibe icon 32 which will then revert to another screen to allow a vibe to be sent to the contact 78. The current screen shows the most recent interactions between the users, but it is possible to scroll up or down the screen to see other interactions that have occurred between the users.

FIG. 9 is the contacts screen 170 showing the details of contacts for a user 20. The large icons 172 show each contact and they are coloured to reflect the most recent status update provided by the contacts. Search icon 174 allows the user to search their contacts and icon 176 allows you to see other contacts, for example recently added contacts. The handshake icon 178 at the top right is for adding a new contact into the app to allow them to communicate with the user via the described method. It is possible to scroll down the contact screen on the right hand side to see users by the first letter of their first name (as for this screen—it may be possible to use surnames or other identification means as well or instead). This screen can be customised to a user's preferred display, for ease of accessibility.

Icons 172*a*-172*d* may have coloured filters over the top of profile pictures. This indicates that the user shown currently has an unbalanced mood. If emotional positivity is balanced—profile picture will remain in non-coloured-see the remaining icons 172e-172i.

Each user has a self-assigned colour that appears as an outer circle around their profile picture (172a-172i). This is the same colour as used for the trace communication as described with reference to FIG. 4(*b*) and as the user's health hub colour on the Home Profile screen. The reason why this is important is because once friends/family are used to an individual's specific colour as used in this communication method—it becomes part of the user's overall identity in the method. Repetition allows the brain to connect properties to a user making communication more simplistic; this is especially useful for people in difficult health-related positions. This is similar to the user's unique identifying vibration pattern; which is also self-assigned.

By holding down an icon for a user (172a-172i), that icon will shift up to the top line of the contacts and a halo, or marker, in their self-assigned vibes colour appears on top of their picture; with the vibration pattern and icons for their current status revealed. This is done through revelation of the icons from their profile that can subsequently be tapped on for more expansive information. E.g. word status ("I feel good" from their profile) if heart is tapped on etc.

It is possible to use the contact screen to enable additional interactions between users. Once a contact is selected, a new page for that contact will open. From this individual contact page it is possible for the users to interact and exchange status information. For example, assume icon 172a for Noor is clicked. The contact page for Noor will be opened and will have the profile picture of Noor in the centre of the screen. If the user then holds down two fingers anywhere on the contact screen they will be able to feel the vibration pattern corresponding to Noor's current emotional/energy status. Two fingers are required to provide the specific pressure pattern to request this information.

In contrast, if the user wishes to send Noor their current status, then they can press down with one finger (to provide the necessary pressure pattern), anywhere on the screen, and this will send the user's current status directly to Noor.

In addition, pressing down on a user's profile picture (on the individual contact screen, or on general contact screen of FIG. 9) allows the users to access the touch events (hugs, high five, kiss etc) that were described previously, and send a desired event to the contact. Also, "double tapping" on a profile picture will send a request to that user for them to provide their current emotional/energy status to the requester.

In addition users may also be provided with a unique audio transmission that identifies them. For example, they may have a unique tonality to their name that is used when sending a vibration pattern to another user. When touch calling, (sending a vibration pattern) instead of the usual ring of a phone call, the ring will be a combination of the two first names' letters in their assigned tones. For example, each letter of the alphabet may be assigned a note or a particular tone for a note, so for a user called Bob, there will be a unique tone of the note assigned to B-note b for example, followed by the note assigned to o-note f for example, then the note assigned to B again-note b. Another user Pat, will have a tonality comprised of the note assigned to the letter P, the note assigned to letter A and the note assigned for letter T. When Bob calls Pat the ring tone will be the assigned tone for the name Bob, followed by the assigned tone for the note Pat, and these will be repeated until the call is answered.

Alternatively, it is possible for each user of the method to record themselves saying there preferred name for identification, in this case Bob, will record himself saying "Bob" (which becomes his identifier) Pat will record herself saying "Pat" (which become her identifier). When there is a call between Pat and Bob, the ringtone may be the recording of these name repeated, so "Bob, Pat, Bob, Pat, Bob. . . " repeated until the call is answered or refused. This is merely a specific type of unique audio transmission.

Other variations and modifications will be apparent to the skilled person. Such variations and modifications may involve equivalent and other features that are already known and which may be used instead of, or in addition to, features described herein. Features that are described in the context of separate embodiments may be provided in combination in a single embodiment. Conversely, features that are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A communication apparatus comprising:
   a first mobile device and a second mobile device,
   in which said first mobile device comprises an input screen for receiving variable first status indicator data about a user and variable second status indicator data about said user,
   in which said input screen comprises a first icon which is manually movable between different positions on said input screen to input said first status indicator data,
   in which said input screen comprises a second icon which is manually movable between different positions on said input screen to input said second status indicator data,
   in which said first mobile device comprises a vibration pattern generation function for generating a variable vibration pattern representing a variability measure based on inputted first status indicator data and second status indicator data, wherein said vibration pattern generation function is configured to generate a vibration pattern comprising a series of beats, each beat comprising at least two pulses of non-zero intensity, wherein the pulses within each beat are spaced at a first frequency, and said beats are spaced at a second frequency,
   in which said first mobile device comprises a transmission function for transmitting said vibration pattern to said second mobile device,
   in which said second mobile device comprises a receiving function for receiving said vibration pattern from said first mobile device,
   in which said second mobile device comprises a haptic vibration generation function for generating a haptic vibration according to said vibration pattern,
   wherein and in which said vibration pattern generation function changes said vibration pattern by varying said first frequency and/or said second frequency, in response to changes in said variable first status indicator data and/or said variable second status indicator data inputted into said input screen by said user.

2. The communication apparatus of claim 1 wherein said vibration pattern generation function is configured to change the intensity of one or more of said pulses of said vibration pattern in response to additional information on said variability measure being inputted into said input by said user.

3. The communication apparatus of claim 1 wherein said vibration pattern generation function is configured to change said first frequency when said user changes said first status indicator data.

4. The communication apparatus of claim 1 wherein said vibration pattern generation function is configured to change said second frequency when said user changes said second status indicator data.

5. The communication apparatus of claim 1 wherein said input screen is configured to receive a unique identifier data of said user, in which said vibration pattern generation function is configured to generate a unique vibration pattern representing said user, in which said transmission function is configured to transmit said unique user vibration pattern to said second mobile device, in which said receiving function is configured to receive said unique user vibration pattern from said transmission function, and in which said haptic vibration generation function is configured to generate a unique user haptic vibration according to said unique user vibration pattern.

6. The communication apparatus of claim 1 wherein said first mobile device comprises an audio recording of the voice of said user, in which said transmission function is configured to transmit said recording to said second mobile device, in which said receiving function is configured to receive said recording from said transmission function, and in which said second mobile device comprises a speaker for emitting said recording.

7. The communication apparatus of claim 1 wherein said input screen is configured to receive first or second status indicator data about said user's energy status.

8. The communication apparatus of claim 1 wherein said input screen is configured to receive first or second status indicator data about said user's emotional status.

9. The communication apparatus of claim 1 wherein said input screen is configured to receive event data from said user, in which said vibration pattern generation function is configured to generate an event vibration pattern representative of said event, in which said event vibration pattern comprises a series of beats, in which said transmission function is configured to transmit said event vibration pattern to said second mobile device, in which said receiving function is configured to receive said event vibration pattern from said transmission function, in which said haptic vibration generation function is configured to generate an event haptic vibration according to said event vibration pattern.

10. The communication apparatus of claim 9 wherein at least one of the beats of said event vibration pattern has standard intensity and at least one of the beats has high intensity.

11. The communication apparatus of claim 10 wherein said event vibration pattern has a defined duration, and in which said transmission function is configured to transmit said event vibration pattern 2 or more times.

12. The communication apparatus of claim 1 in which said input screen comprises an interaction screen defining an x axis and a y axis for recording x-y coordinate information of a first path manually traced thereon by said user, in which said transmission function is configured to transmit said x-y coordinate information to said second mobile device, in which said receiving function is configured to receive said x-y coordinate information from said transmission function, and in which said second mobile device comprises a display screen for re-creating and displaying said first path.

13. The communication apparatus of claim 12 wherein said interaction screen is configured to record x-y coordinate information of a plurality of discrete sub-paths manually traced thereon by said user, and in which said display screen for recreates and displays said plurality of discrete sub-paths.

14. The communication apparatus of claim 1 in which said apparatus comprises a plurality of third mobile devices, each one of which comprises an interaction screen defining an x axis and a y axis for recording x-y coordinate information of third paths manually traced thereon by users of said third mobile devices, in which each of said third mobile devices comprises a transmission function for transmitting said x-y coordinate information of the corresponding third path to said second mobile device, in which said second mobile device comprises a display screen for re-creating and displaying said plurality of third paths using different display means to distinguish between third paths of each users of a third mobile device.

15. The communication apparatus of claim 1 wherein said first mobile device comprises a status screen showing a current status of said variable first status indicator data and said variable second status indicator data, wherein a colour and/or pattern background of said status screen provides visual information about said current status of said user.

16. The communication apparatus of claim 1 in which said apparatus comprises a plurality of third mobile devices, each one of which comprises an input screen for receiving information about the current status of users thereof, in which said third mobile devices each comprise a transmission function for transmitting said information, in which said first mobile device comprises a receiving function for receiving said information from said transmission functions, wherein said first mobile device comprises a contact screen for showing an icon for the users of each of said third mobile devices including information about the current status of each of said users.

17. A communication apparatus comprising:

a first mobile device and a second mobile device, in which said first mobile device comprises an input for receiving variable first status indicator data about a user and variable second status indicator data about said user, in which said first mobile device comprises a vibration pattern generation function for generating a variable vibration pattern representing a variability measure based on inputted first status indicator data and second status indicator data, wherein said vibration pattern generation function is configured to generate a vibration pattern comprising a series of beats, each beat comprising at least two pulses of non-zero intensity, wherein the pulses within each beat are spaced at a first frequency, and said beats are spaced at a second frequency, in which said first mobile device comprises a transmission function for transmitting said vibration pattern to said second mobile device, in which said second mobile device comprises a receiving function for receiving said vibration pattern from said first mobile device, in which said second mobile device comprises a haptic vibration generation function for generating a haptic vibration according to said vibration pattern, and in which said vibration pattern generation function changes said vibration pattern by varying said first frequency and/or said second frequency, in response to changes in said variable first status indicator data and/or said variable second status indicator data inputted into said input by said user.

\* \* \* \* \*